United States Patent [19]

Goodell et al.

[11] Patent Number: 4,733,707
[45] Date of Patent: Mar. 29, 1988

[54] VEHICLE WHEEL END ASSEMBLY

[75] Inventors: Fred L. Goodell, Grosse Ile; Michael J. Ellison, Canton, both of Mich.

[73] Assignee: AM General Corporation, Livonia, Mich.

[21] Appl. No.: 712,420

[22] Filed: Mar. 18, 1985

[51] Int. Cl.[4] ................ B60C 29/00; B65D 69/00; F16J 15/16

[52] U.S. Cl. ......................... 152/417; 137/224; 137/351; 141/38; 152/427; 206/223; 206/335; 277/58; 277/59; 277/153; 285/110; 301/5 VH

[58] Field of Search .............. 152/415, 416, 417, 427, 152/378 R, 379.3, 379.5, 399, 400; 277/152, 153, 12, 59, 58; 285/96, 98, 110, 111, DIG. 25; 141/38; 301/105 R, 5 VH, 126, 131, 132, 124 R, 124 H; 137/224, 351; 206/223, 335

[56] References Cited

U.S. PATENT DOCUMENTS

| | | | |
|---|---|---|---|
| 1,988,671 | 1/1935 | Stout | 152/416 |
| 2,693,841 | 11/1954 | Webster, Jr. | 152/417 |
| 3,363,452 | 1/1968 | Harnish | 73/45.2 |
| 3,705,614 | 12/1972 | Juttner et al. | 152/417 |
| 4,418,737 | 12/1983 | Goodell et al. | 152/416 |
| 4,431,043 | 2/1984 | Goodell et al. | 152/417 |
| 4,434,833 | 3/1984 | Swanson et al. | 141/38 X |
| 4,470,506 | 9/1984 | Goodell et al. | 152/417 X |
| 4,498,709 | 2/1985 | Wells et al. | |

Primary Examiner—Donald E. Czaja
Assistant Examiner—Thomas Bokan
Attorney, Agent, or Firm—Brooks & Kushman

[57] ABSTRACT

A vehicle wheel end assembly (10) is adaptable for use with an on-board central tire inflation system. The assembly provides a passage for the routing of air between a central source and the vehicle tire (25). The assembly comprises a stationary spindle (12) and a rotational hub (14) mounted thereon. A collar (34) is mounted on the inboard end of the spindle in interfacing relation with an inboard extension (50) of the hub. An air chamber, defined by the radial spacing of the collar (34) and hub extension (50), communicates air passages in the collar and hub (36, 44). The chamber is fitted with a pair of rotary seals (72, 74) to seal the air passage between the stationary collar (34) and rotating hub (14). The rotary seals (72, 74) each include an integral sealing lip (80) which responds to pressurization of the chamber by biasing into sealed relation with the outer surface of the collar (34).

21 Claims, 5 Drawing Figures

VEHICLE WHEEL END ASSEMBLY

TECHNICAL FIELD

This invention relates to a central tire inflation system, and, more particularly, to a wheel end assembly which is adapted for use with such systems.

BACKGROUND ART

A central tire inflation system offers an advantage to vehicles whose service requirements call for operation on varying terrain, e.g. soft sand, snow, cross-country or hard surface roads. This system generally provides for inflation or deflation of the vehicle tires according to the entry of a control signal by the vehicle operator. The control signal is pneumatically or electronically communicated to the system and the tires are appropriately charged or vented with air routed through the wheel end assembly associated with each tire.

One of the design problems inherent in central tire inflation systems is the need for a reliable seal in the wheel assembly between rotating and non-rotating members. A number of design considerations associated with this problem are discussed in columns 1 and 2 of U.S. Pat. No. 4,470,506, assigned to the assignee of the present invention.

Moreover, it can be quite costly to retrofit a standard production wheel end assembly with an air passage for a central tire inflation system and meet the foregoing criteria. More particularly, this may, in some cases, require the removal of the wheel to permit fitting of the axle spindle with additional internal componentry, as well as machining operations, such as rifle drilling, to adapt the production assembly for central tire inflation.

An example of one design proposal for a rotary seal assembly for a central tire inflation system is shown in U.S. Pat. No. 4,434,833. Specifically, with reference to FIG. 5, a rotary seal assembly includes two air seal lips which are press fit against the surface of an annular ring. However, the practicability of this design is subject to the integrity of the air seal obtained by the press fitting of the air seal lips. Any press fitting of seal members in a dynamic operating environment is adversely affected by variations in seal dimensions, misalignment of seals during assembly, and wear and disturbance of the seals over their operating life. Thus, the design of U.S. Pat. No. 4,434,833 is felt to be attended by these limitations.

DISCLOSURE OF THE INVENTION

The present invention has for its objectives the provision of a wheel end assembly for a central tire inflation system which can be economically outfitted for use with a central tire inflation system and provide efficient performance without the problems attendant to prior art designs.

A wheel end assembly of the present invention comprises an axle spindle or housing which is non-rotational and attached to the vehicle chassis. A hub is mounted concentrically on the wheel spindle for rotation thereon. The hub is driven or connected to an axle shaft disposed within the spindle and connected at the outboard end by a drive flange. A collar is mounted on the inboard portion of the spindle, and the annular space bounded by the spindle, hub and collar defines an air chamber. The inner surface of the hub which bounds the chamber is provided with rotary seals which contact the collar to provide an airtight seal.

The sealing arrangement between the stationary collar and the rotating hub is effective to provide a sealed air passage between these members. More specifically, the arrangement provides for a pair of axially-spaced, counterposed seals. Each seal has a vertical or radial segment which is press fit into the radial dimension of the air chamber, and an integral horizontal lip which extends from the lower end of the vertical segment. The lower portion of the lip has a Teflon tip which has a low friction contact with the spindle outer surface. The lip is biased into sealing relation with the spindle surface by two effects. First, a garter spring is used in a conventional fashion to apply an inward radial force on the lip. Second, the air pressure within the chamber is used to an advantage to cause the lip to bear against the outer spindle surface. This dynamic phenomenon assists the spring and secures an effective seal for the communication of air from a passage in a stationary member to a passage in a rotating member.

In another feature of the invention, the hub is cast with a longitudinal passage communicating at the inboard end with the air chamber and at the outboard end with pneumatic circuitry connecting the hub to the tire. This feature allows the use of such a hub in standard production vehicles, and permits selective retrofitting of such vehicles with central tire inflation systems with minimal cost and effort.

Other advantages and features of the present invention will become apparent in connection with the following detailed description in which reference is made to the drawings.

BEST MODE FOR CARRYING OUT INVENTION

Figure 1:
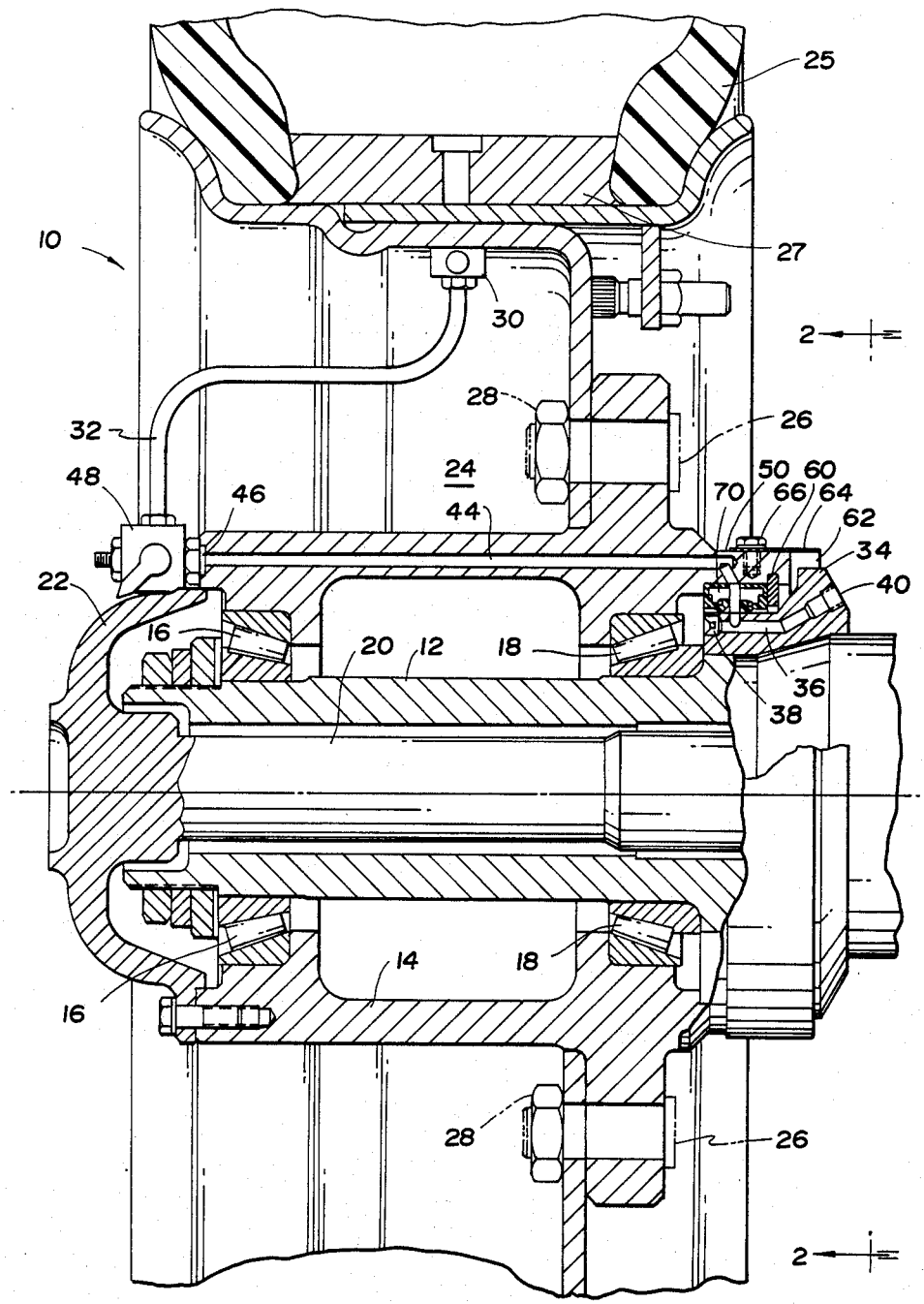
FIG. 1 is a side sectional view of a vehicle wheel end assembly in accordance with the present invention.

FIG. 1 illustrates a vehicle wheel end assembly, indicated generally at 10, suited for use with a central tire inflation system. In this type of system, the pressurization of the vehicle tires is controlled by the operator in response to the traction requirements of the vehicle. The embodiment of wheel end assembly 10 shown in FIG. 1 has particular utility with the rear axles of a conventional military truck.

The wheel end assembly 10 includes a spindle or axle housing 12 which is mounted in fixed relation to the vehicle. A hub 14 is mounted for rotation on the spindle 12 and supported by bearing sets 16 and 18. An axle shaft 20 terminates at its outboard end in a drive flange 22. The flange 22 is coupled to the hub 14 to transmit drive torque to the hub in a conventional manner.

A wheel 24 is attached to the hub 14 by bolts 26 and nuts 28. A tire 25 is mounted on the wheel 24. The center well of the wheel 24 is fitted with a bead lock 27 to preserve the sealed mounting of the tire 25 when under low inflation.

The tire is communicated to the central tire inflation system through a port 30. A formed tube 32 provides an external connection between the port 30 and a shut off valve 48.

An attribute of the hub 14 is that it may be used in the embodiment shown with or without central tire system capability. The hub is preferably cast from ductile iron in compliance with A.S.T.M. Material specification A536, but may alternately be cast from pearlitic malleable iron in compliance with A.S.T.M. Material specification A220. It is preferable to cast the hub 14 with a longitudinal core to provide an air passage 44 to suit it for use with a central tire inflation system. Alternately, the air passage 44 on the hub may be formed after casting by drilling.

Figure 5:
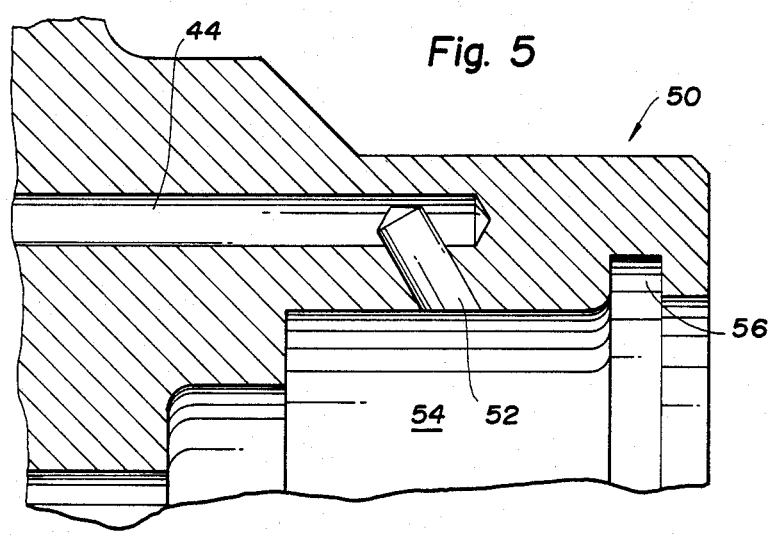
FIG. 5 is an enlarged view of the inboard portion of the hub of FIG. 1.

As can be seen in FIG. 1, the air passage 44 extends from an outboard port 46 over the major longitudinal dimension of the hub to an inboard hub portion 50. With reference to FIG. 5, the air passage 44 meets a short adjoining section 52 formed in an inner annual recess 54 in the inboard portion of the hub 50. An annular slot 56 is also formed in the inboard portion 50 to seat a lock ring, as will be described subsequently.

Again with reference to FIG. 1, the wheel end assembly 10 is fitted with a collar 34 to adapt it for use with a central tire inflation system. The collar 34 is mounted concentrically on the spindle 12 in the radial space between the spindle and the inboard hub portion 50. The function of the collar is to incorporate an inlet air passage. A rotary seal assembly forms an air chamber which communicates with the air passage 44 through the hub 14.

Figure 3:
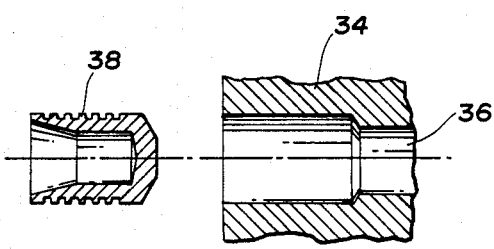
FIG. 3 is an enlarged view of an inboard portion of the air passage through the collar shown in FIG. 1.

The collar 34 has an internal air passage 36 extending from inboard port 40 to the outer radial surface of the collar. The outboard continuation of the passage 36 in the collar 34 formed by a drilling operation is closed by a plug 38, as shown in greater detail in FIG. 3. The port 40 is adapted to receive a threaded air line connection from the central tire inflation system. The collar 34 may be secured in position by set screws (not shown) or other conventional fasteners connecting the collar to the spindle. A dust seal 62 is, held in position by bolts 66.

Figure 2:
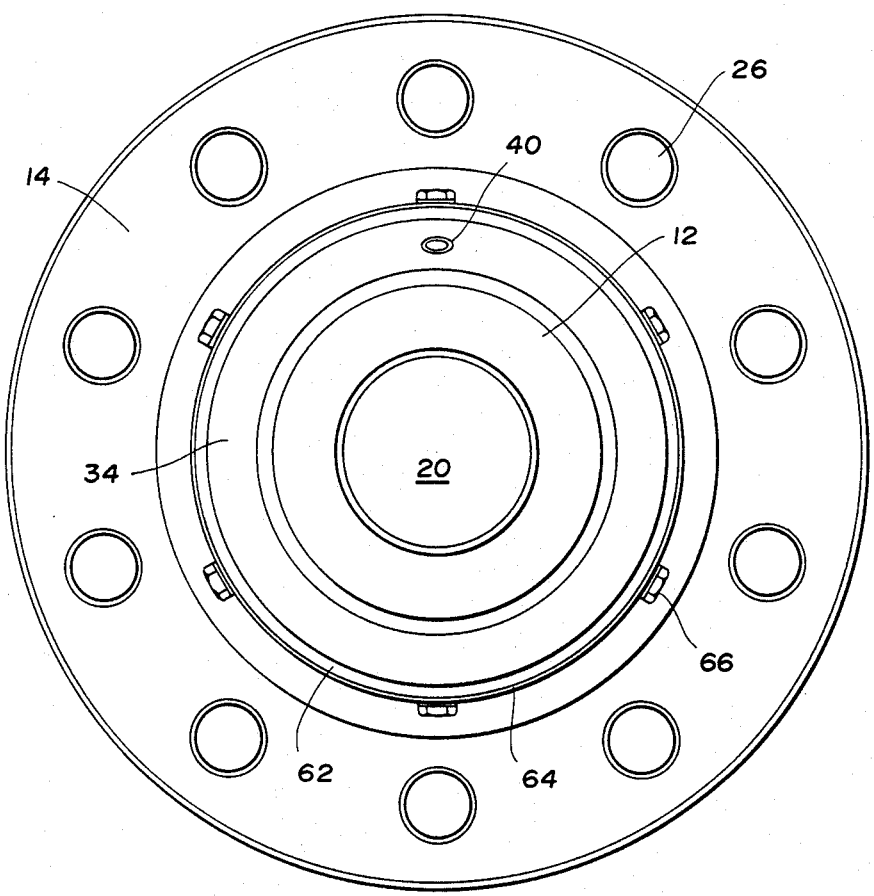
FIG. 2 is an end view taken along line 2—2 of the wheel end assembly of FIG. 1.

FIG. 2 illustrates the concentric mounting of the axle shaft 20, spindle 12, collar 34, dust seal 62 and closure ring 64.

Again with reference to FIG. 1, a rotary seal assembly 70 is interposed in the radial space between the collar 34 and the inboard hub portion 50. The function of the rotary seal assembly is to communicate the air passage 36 in the stationary collar 34 with the air passage 44 in the rotating hub 14. The seal assembly 70 is secured against axial displacement by a lock ring 60 which seats in the annular slot 56 noted in connection with FIG. 5.

Figure 4:
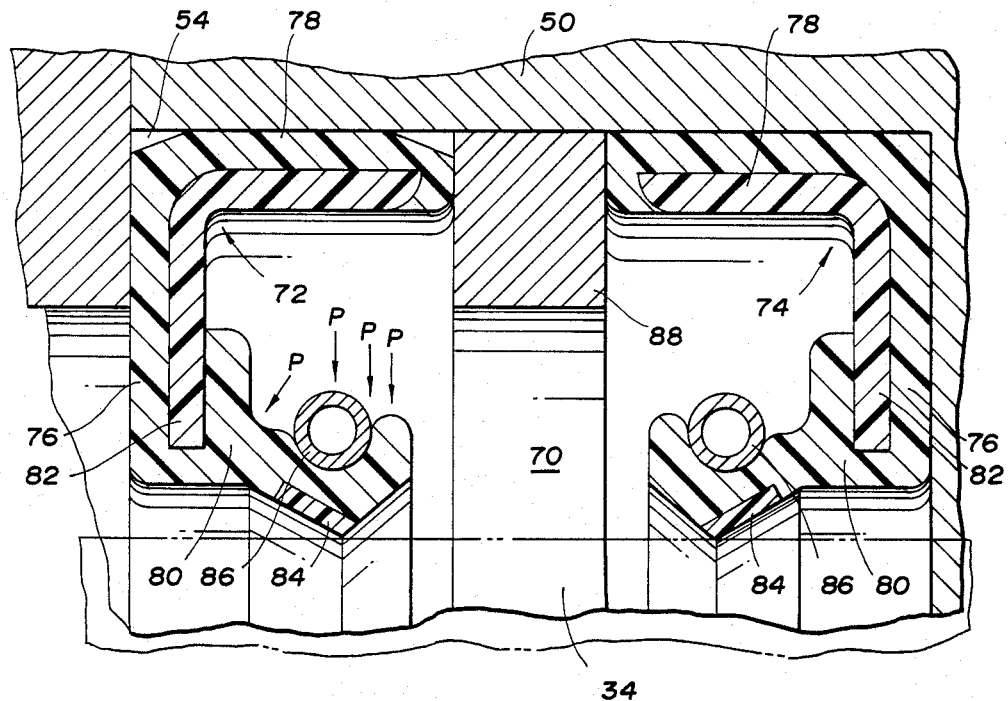
FIG. 4 is an enlarged sectional view of rotary air seals adapted for use of the present invention.

With reference to FIG. 4, the rotary seal assembly 70 is seated in the inner annular recess 54 of the inboard hub portion 50. The rotary seal assembly includes first and second annular sealing rings 72 and 74. The rings are spaced axially from one another and are positioned in opposed facing relation.

Each of the sealing rings 72 and 74 has a cross sectional shape characterized by a vertical or radial member 76 from which extend upper and lower integral lip members 78 and 80 respectively. The upper lip members are separated by a spacer 88 which preferably takes the form of a wave washer i.e., an annular member having axial undulations. The advantage of this shape allows the wave washer 88 to maintain the axial spacing between the upper lip member 78 without closing access to the port 52 (as shown in FIG. 5) in the inboard hub portion 50.

The radial segment 76 and upper lip member 78 are provided structural reinforcement by a metallic liner 82. The liner 82 assists a secure press fitting of the radial segment 76 and upper lip member 78 against adjacent wall surfaces.

The lower lip segment 80 provides the sealed interface between the stationary collar 34 and the rotating hub 14. The lip member 80 is fitted with a Teflon ring for a low friction sealing contact with the collar 34.

The sealed contact is maintained by two phenomena biasing the lower lip member 80 against the surface the collar 34. The first phenomenon is the inward radial force developed by a garter spring 86 mounted under load on the upper surface of the lip member 80.

The second phenomenon is the force exerted by the presence of air pressure in the chamber effectively defined by the oppositely positioned sealing ring 72 and 74. As shown by the symbol "P", the air pressure exerts a normally directed force on the upper surface of the lip member 80 to urge the member radially inward and into sealing contact with the upper surface of the collar 34 (shown in phantom). Moreover, the presence of air pressure also assists the sealing of the radial segment 76 and the upper lip member 78 against their respective wall surfaces.

Accordingly, by the function of the rotary seal assembly 70, a continuous air passage through the wheel assembly is achieved. Again with reference to FIG. 1, the onboard, central tire inflation system can be communicated to the port 30 through the wheel end assembly 10 to permit inflation or deflation of the tire. The overall path includes the internal air passage 36 through the collar 34, the rotary seal assembly 70, the internal air passage 44 through the hub 14, the shut off valve 48, and the formed tube 32.

A feature of the present invention lies in the adaptability of this design to retrofitting of assembled production vehicles to include central tire inflation system capability. If the production vehicle is built with a hub of the type shown at 14, then the componentry necessary to central tire inflation capability can be installed on the vehicle without significant cost or effort.

The foregoing has described the invention in an illustrative embodiment. Other varying embodiments may suggest themselves to persons having skill in the art without departing from the scope of the following claims.

The embodiments of the invention in which an exclusive property or privilege is claimed are defined as follows:

1. A vehicle wheel end assembly adapted for use with an automated system for controlling tire pressurization comprising:
   a spindle mounted in fixed relation to the vehicle;
   a hub mounted for rotation on the spindle and adapted to carry a wheel, said hub having an inboard portion spaced radially from the spindle, and an internal air passage extending from the inner radial surface of said inboard portion to the outboard end of said hub;
   a collar mounted concentrically on the spindle in axial alignment with and spaced radially from the inboard portion of the hub, said collar having an internal air passage extending from the outer radial surface of the collar to its inboard end; and rotary seal means, interposed in the radial space between the collar and the inboard portion of the hub, for communicating the internal air passages in the collar and the hub, said rotary seal means including lip members which are biased into a sealing position against an adjacent one of the radially spaced collar and hub;

wherein said rotary seal means comprises first and second annular sealing rings axially spaced from one another;

wherein said rotary seal means further includes spacer means, disposed between said first and second sealing rings for maintaining the axial spacing therebetween; and wherein said spacer means comprises an annular member having axial undulations.

2. The assembly of claim 1 wherein the inboard portion of the hub includes an inner annular recess for seating the rotary seal means.

3. The assembly of claim 1 wherein each sealing ring has a cross sectional shape characterized by at least a radial member spanning the space between the hub and the collar, and an integral lip member extending axially and in contact with the adjacent surface of the collar, whereby the integral lip member is biased into sealed relation with the collar by the presence of air pressure within the rotary seal means.

4. The assembly of claim 3 wherein each sealing ring further comprises a second integral lip member extending axially and in sealing contact with the adjacent surface of the inboard portion of the hub.

5. The assembly of claim 3 wherein the rotary seal means includes first and second radial bias means for applying an inward radial force to the integral lip member.

6. The assembly of claim 5 wherein each of said radial bias means comprises a garter spring mounted under load on a respective integral lip member.

7. The assembly of claim 3 wherein each integral lip member includes a low friction contact element for contacting the adjacent surface of the collar.

8. The assembly of claim 7 wherein said low friction contact element comprises a Teflon liner.

9. The assembly of claim 1 further comprising retainer means for securing the rotary seal means against axial displacement.

10. The assembly of claim 9 wherein the retainer means comprises a lock ring disposed in an annular slot in the hub portion inboard of the rotary seal means.

11. A kit for retrofitting a vehicle wheel end assembly for use with an automated system for controlling tire pressurization, said wheel end assembly being of the type having a spindle mounted in fixed relation to the vehicle and a hub mounted for rotation on the spindle and having an internal air passage extending between the outboard end of the hub and the inner radial surface of an inboard portion of the hub which is radially spaced from the spindle, said kit comprising:

an adapter collar mountable on the spindle proximate the inboard end thereof and in radially spaced relation to the hub, said collar having an internal air passage extending between its outer radial surface and inboard portion for transmitting pressurized air; and rotary seal means, adapted to be interposed in the radial space between collar and the hub, for communicating the internal air passages in the collar and the hub, said rotary seal means including lip members biased into a sealing position against an adjacent one of the radially spaced collar and hub;

wherein said rotary seal means comprises first and second annular sealing rings axially spaced from one another;

wherein said rotary seal means further includes spacer means, disposed between said first and second sealing rings for maintaining the axial spacing therebetween; and wherein said spacer means comprises an annular member having axial undulations.

12. The kit of claim 11 wherein each sealing ring has a cross sectional shape characterized by at least a radial member for spanning the space between the hub and the collar, and an integral lip member for extending axially and in contact with the adjacent surface of the collar, whereby the integral lip member is biased into sealed relation with the collar by the presence of air pressure within the rotary seal means.

13. The kit of claim 11 wherein the rotary seal means includes first and second radial bias means for applying an inward radial force to the integral lip member.

14. The kit of claim 13 wherein each of said radial bias means comprises a garter spring for mounting under load on the integral lip member.

15. The kit of claim 11 wherein each integral lip member includes a low friction contact element for contacting the adjacent surface of the collar.

16. The kit of claim 11 wherein said low friction contact element comprises a Teflon liner.

17. The kit of claim 11 further comprising retainer means for securing the rotary seal means against axial displacement.

18. The kit of claim 11 further comprising connector means for connecting the outboard end of the passage in the hub with a vehicle tire air passage therebetween.

19. The kit of claim 18 wherein the connector means includes a shut off valve.

20. In combination with a vehicle wheel end assembly adapted for use with an automated system for controlling tire pressurization and having a spindle mounted in fixed relation to the vehicle, and a fixed peripheral surface on the spindle having an aperture, and also having a hub mounted for rotation on the spindle and adapted to carry a wheel, the hub having an inboard portion spaced radially from the fixed peripheral surface on the spindle and also having an internal passageway extending from the inner radial surface of the inboard portion to the outboard end of the hub, the improvement comprising:

rotary seal means adapted to be interposed in the radial space between the peripheral surface and the hub for coupling the aperture in fluid communication with the internal passageway;

wherein the seal means comprises first and second sealing rings axially spaced from each other;

wherein each sealing ring includes a radial member spanning the space between the inboard portion and the peripheral surface, and at least one integral lip member at an end of the radial member extending axially in contact with an adjacent one of said peripheral surface and said inboard portion, whereby the integral lip member is exposed to air pressure within the rotary seal means for biasing the lip into sealing engagement with said adjacent one of said peripheral surface and said inboard portion;

wherein said rotary seal means further includes spacer means, disposed between said first and second sealing rings for maintaining the axial spacing therebetween; and wherein said spacer means comprises an annular member having axial undulations.

21. The invention as defined in claim 20 wherein the fixed peripheral surface is an exterior surface of a collar mounted to said spindle, and further comprising a passageway in said collar extending from said aperture to the inboard end of said collar.

* * * * *